C. P. STANBON.
BRAKE.
APPLICATION FILED APR. 11, 1918.

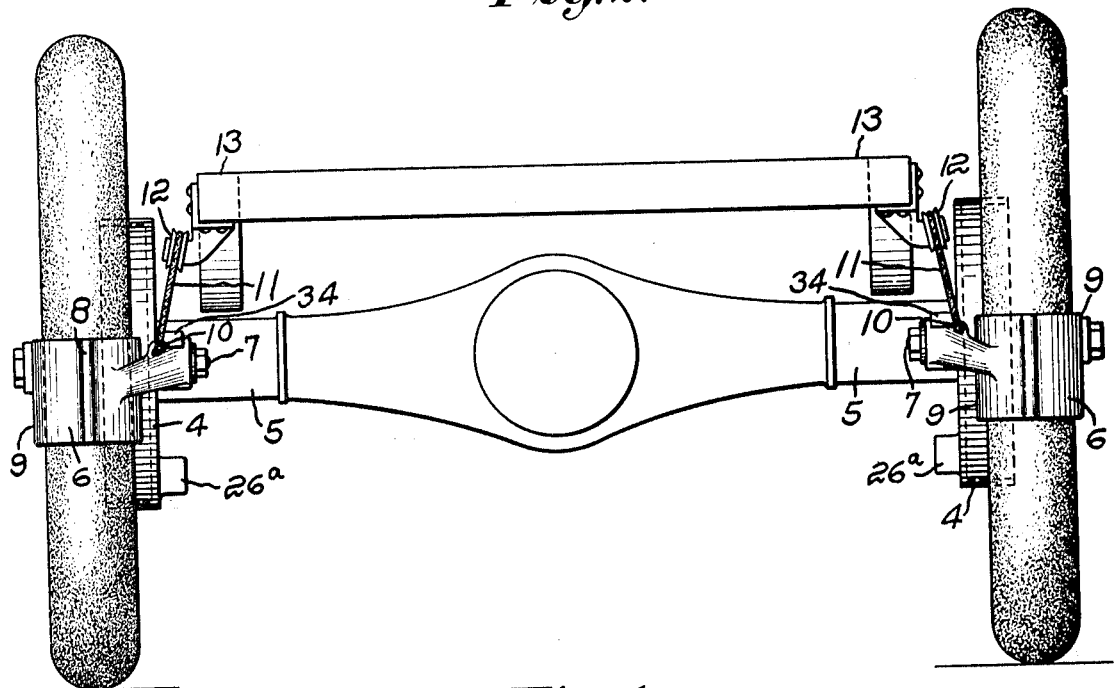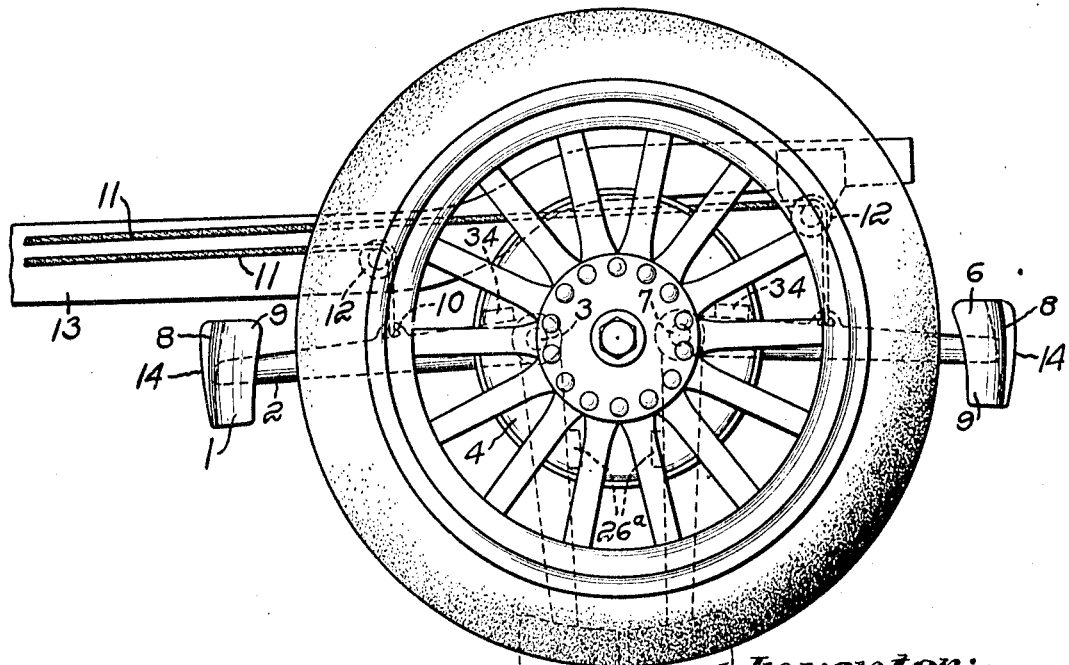

1,309,590.

Patented July 8, 1919.
2 SHEETS—SHEET 2.

Inventor:
Charles P. Stanbon,
by Emery, Booth, Janney & Varney
Attys.

UNITED STATES PATENT OFFICE.

CHARLES P. STANBON, OF LYNN, MASSACHUSETTS.

BRAKE.

1,309,590. Specification of Letters Patent. Patented July 8, 1919.

Application filed April 11, 1918. Serial No. 227,949.

*To all whom it may concern:*

Be it known that I, CHARLES P. STANBON, a citizen of the United States, and a resident of Lynn, county of Essex, and State of Massachusetts, have invented an Improvement in Brakes, of which the following description, in connection with the accompanying drawings, is a specification, like characters on the drawings representing like parts.

This invention relates to brake mechanism for vehicles and its aim is to provide novel emergency brake and anti-skidding means adapted particularly for motor vehicles.

In the drawings of the embodiment of my invention described and illustrated herein;

Figure 1 is a side elevation of a part of the chassis of a motor vehicle, the frame broken away, showing the brake shoes thereon;

Fig. 2 is a rear end elevation of the chassis, showing the same mechanism in part;

Figure 4:
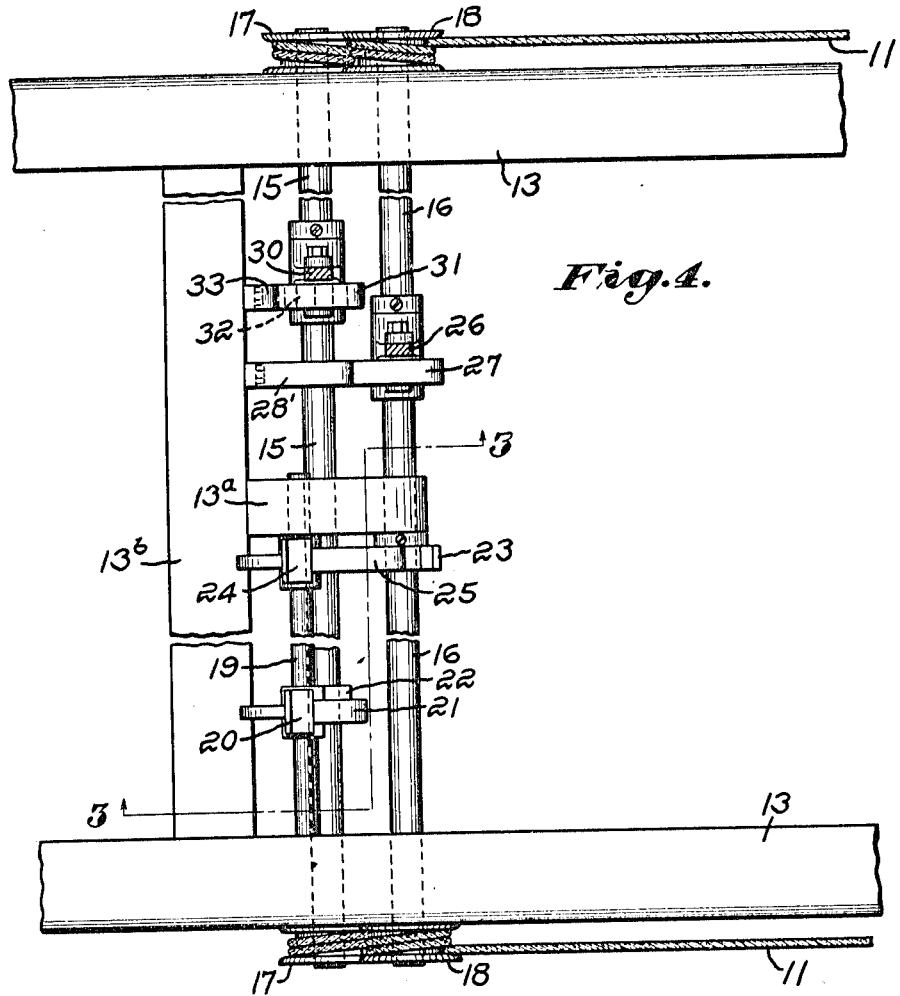
Fig. 4 is a plan of the same.

Referring first to Figs. 1 and 2, my novel brake mechanism comprises a suitable brake and anti-skidding shoe 1, carried by an arm 2 pivoted at 3 to the usual brake drum housing 4 on the axle 5. A similar wheel-blocking shoe 6 is likewise pivoted at 7 on the drum housing 4.

These shoes are preferably not of the friction type, but rather of the block or wedge type, and obviously are more effective for present purposes than frictionally operative members.

I prefer to pivot the arms 2 upon the brake drum housing in order to avoid the usual brake rods which approach the axle from the forward end of the car. It is very difficult otherwise to present a safe, simple construction.

While the shoe 1 is usually more effective as an anti-skid member than the shoe 6, because skidding more often occurs when the car is going forward rather than backward, nevertheless both shoes may advantageously be used at times for that purpose.

The shoes 1, 6, Fig. 1, each comprise a preferably wedge shaped tread 8, of convenient weight and width, with a flange 9 thereon for strengthening the same and also to assist in retaining the tread in proper position in emergencies relative to the tires on the wheels.

Figure 3:
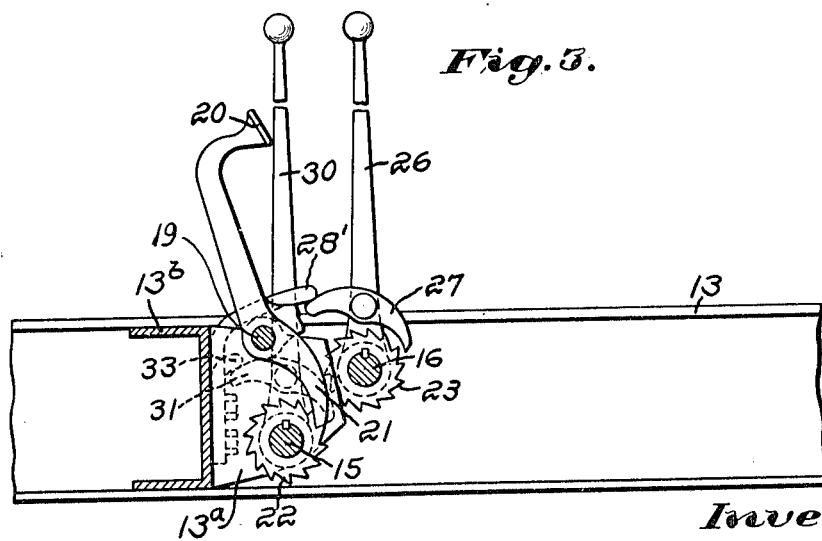
Fig. 3 is a side elevation, partly in section, of the controlling levers for manipulating the shoes, a part of the car frame only being shown.

Each shoe is carried at the end of the arm 2 in each case, as stated, the arm being provided with an eye 10 to receive the end of a cable 11 passing over a pulley 12 on the frame 13 and thence forward to the operating lever (see Fig. 3) to be described. Similar shoes are provided for the opposite side of the car.

The arms 2 (Fig. 1) being pivoted respectively slightly in advance and in the rear of the wheel centers, their outer ends of course swing away from the tires when in raised position, thus freeing the shoes therefrom.

The shoes, as will be readily seen, are adapted to fit snugly as wedges between the wheel and the ground, each on its particular side of the wheel, and act effectively to prevent movement of the wheel in that particular direction. Each shoe also has a longitudinal anti-skidding rib 14 thereon which is an additional safeguard against skidding, particularly on soft ground.

I have also invented novel brake controlling means which I will now describe.

Forward on the car frame, Fig. 4, and conveniently positioned for the operator, are two cable and shoe controlling shafts 15, 16, having bearings in the frame members 13, 13, and carrying on their ends pulleys 17, 18, respectively for the cable 11.

The anti-skidding cable 11 passes over and is wound upon the pulley 17 and the wheel blocking cable 11 is likewise received by a like pulley 18, both being secured in any customary manner upon their respective shafts. Like cables are secured in the same manner upon the opposite side of the chassis, and to the opposite ends of the shafts 15—16.

For controlling the anti-skidding cables and shoes 1, I provide a novel arrangement comprising separate shoe retaining and applying means, shown herein (Figs. 3 and 4) as a rod 19 suitably supported at one end in the frame member 13 and at its opposite end in a bracket 13ª secured to any convenient part of the frame as the cross bar 13ᵇ.

The rod 19 (Fig. 3) carries a brake applying foot pedal 20, and a dog 21, adapted normally to engage a ratchet pinion 22 on the shaft 15 when the anti-skidding shoes 1 are raised in inoperative position, and to lock the pinion 22 against movement that would release the shoes.

On the shaft 16 (see Fig. 4) I likewise provide a ratchet pinion 23 and on the rod 19 a foot pedal 24 with a depending dog 25 thereon for controlling the pinion 23 in the same manner as the pinion 22, to hold the wheel blocking shoes 6 in inoperative and raised position.

When the car going forward is likely to skid, or in any emergency it is desired to stop it suddenly, the anti-skidding shoes 1 are released by the foot, simply by pressing forward slightly the foot pedal 20, thereby raising the dog 21 from engagement with the pinion 22 and permitting the forward or anti-skidding shoes to drop instantly and wedge themselves between the wheels and the ground (see dotted line position Fig. 1). Stops 26$^a$ are provided for the arms 2 so that when the shoes 1, 6 have been properly positioned they are prevented from going any farther and all danger of the wheel going over them is avoided.

Similar action with the foot pedal 24 will release the wheel blocking shoes 6 to prevent the car from skidding while backing, or from backing down a steep hill whenever the usual brake is not sufficient to hold the car in such a position, or in case the usual brake mechanism gives way for any reason.

The advantage of my novel means for applying the brake by use of the foot as compared with manually operated brake applying means is obvious. It is always important that the driver of an automobile have both hands free for control of the steering wheel. Particularly is this true when he is confronted with conditions that may require him to apply his emergency brake and if he can apply it by slight foot pressure he is in a much safer position. Furthermore, my novel brake can be applied more quickly than can a manually operated one.

For winding up the cable 11 (Fig. 3) and raising the wheel blocking shoes 6, I have provided, as stated, a separate shoe raising and positioning means as a lever 26, loosely mounted on the shaft 16 and carrying a dog 27, adapted to engage a ratchet pinion 28 fast to the shaft 16. This dog engages the teeth of the pinion 28 and acts to rotate it and wind up the cable 11 on the shaft 16 to raise the wheel blocking shoes 6 when the lever is drawn backward or to the right (Figs. 3 and 4), and by this means the shoes may be readily raised into inoperative position, gradually, and with little effort as compared with the strength required to raise such shoes by one movement only of the lever, were the shoes directly connected to the lever. But when the lever is thrown into normal upright position (Figs. 3 and 4) the rear end of the dog 27 engages a trip member 28' on the cross sill 13$^b$, which depresses the dog and raises its forward end from the pinion 28, leaving the pinion and its shaft 16 free to rotate and release the wheel blocking shoes when the dog 25 is pressed forward by means of a lever 24.

A similar lever 30 is mounted loosely on the shaft 15, carrying a dog 31, which acts in a similar manner upon a ratchet pinion 32 on the shaft 15 (Fig. 4, dotted lines) to rotate the same to the right and raise the anti-skidding shoes 1 into inoperative position. This dog, however, is released from its engagement with the pinion 32 when the lever 30 is raised to upright position (see Fig. 3) by the rear end of the dog 31 engaging a trip member 33 also on the sill 13$^b$, thereby raising the forward end of the dog and leaving the shaft 15 free to turn and release the cable 11 and shoes 1 when released by the pedal 20 and dog 21.

Stops 34 are also provided for the arms 2 to prevent them from being raised too high and against which they may be firmly held when in inoperative position to offset any tendency to jump on account of the motion of the car.

While I have shown herein one embodiment of my invention, it is obvious that detailed changes may be made, all within the spirit of the invention and the scope of the appended claim.

Claim:

The combination with the side sills of an automobile, and a cross sill between them, and an axle, of a plurality of brake drum housings on the axle, an arm pivotally mounted on each housing carrying a shoe having an anti-skid rib, a stop to limit the travel of the arm, a shoe controlling shaft with a pulley on each end and mounted upon the side sills, a rope on each pulley connected with one of said arms, a ratchet wheel on the shaft, a shoe raising lever mounted to rotate about the shaft and having a pawl to engage the ratchet wheel to raise the shoe to inoperative position, a trip member on the cross sill to trip the pawl when the lever is drawn backward to disengage the pawl from the ratchet, and a foot pedal carried by the cross sill with a pawl thereon to engage said ratchet wheel to retain it and the shaft, pulley and shoe in inoperative position, and to release them to throw the shoe into operative position.

In testimony whereof, I have signed my name to this specification.

CHARLES P. STANBON.